US008117783B2

(12) United States Patent
Hilty (10) Patent No.: US 8,117,783 B2
(45) Date of Patent: Feb. 21, 2012

(54) GATE FOR MARINE ANIMAL TRAP (76) Inventor: David J. Hilty, Kodiak, AK (US)

( * ) Notice: Subject to any disclaimer, the term of this patent is extended or adjusted under 35 U.S.C. 154(b) by 232 days.

(21) Appl. No.: 12/433,969

(22) Filed: May 1, 2009

(65) Prior Publication Data

US 2010/0275504 A1   Nov. 4, 2010

(51) Int. Cl.
*A01K 69/06* (2006.01)
*A01K 69/08* (2006.01)

(52) U.S. Cl. ............................. 43/100; 43/102

(58) Field of Classification Search ............ 43/100–106
See application file for complete search history.

(56) References Cited

U.S. PATENT DOCUMENTS

| | | | | |
|---|---|---|---|---|
| 3,271,894 | A | * | 9/1966 | Manno et al. ............... 43/65 |
| 3,906,655 | A | * | 9/1975 | Lowenthal, Jr. ............ 43/100 |
| 4,107,867 | A | * | 8/1978 | Kennedy ..................... 43/65 |
| 4,184,283 | A | | 1/1980 | Wyman |
| 4,611,424 | A | * | 9/1986 | Tarantino ................... 43/100 |
| 4,648,200 | A | * | 3/1987 | Miller et al. ............... 43/102 |
| 4,843,756 | A | | 7/1989 | Wyman |
| 4,848,025 | A | * | 7/1989 | Wyman et al. ............ 43/102 |
| 4,905,405 | A | | 3/1990 | Hendricks |
| 5,168,653 | A | | 12/1992 | Wyman et al. |
| 5,478,273 | A | | 12/1995 | Ives |
| 5,771,627 | A | | 6/1998 | Mattson et al. |
| 6,035,575 | A | | 3/2000 | Hilty |
| 7,874,097 | B2 | * | 1/2011 | Goodwin, III ............. 43/65 |
| 7,913,448 | B2 | * | 3/2011 | December ................. 43/100 |

OTHER PUBLICATIONS

Hilty, David J. d/b/a Hilty Triggers, photos of molded gate assemblies on sale more than one year prior to the filed of present application, 4 sheets (at least as early as Apr. 30, 2008).

* cited by examiner

*Primary Examiner* — David Parsley
(74) *Attorney, Agent, or Firm* — Stoel Rives LLP

(57) ABSTRACT

A trigger for a marine animal trap is preferably constructed from two identical, or nearly identical, parts. The two parts are substantially flat as manufactured, and are constructed to have connector sections that fold without breaking away from each substantially flat part. The connector sections overlap and secure to one another, preferably with integral connection facilitators on each connector section. Fingers from each substantially flat part converge towards one another when the connector sections are secured together. Optional excluder bars may be included on each substantially flat part, and may be bent towards one another and secured together.

20 Claims, 6 Drawing Sheets

GATE FOR MARINE ANIMAL TRAP

TECHNICAL FIELD

The present invention relates to traps for catching marine animals and, in particular, to an entrance gate for using such traps to catch bottom-dwelling fish such as cod and bottom-dwelling animals such as crabs.

BACKGROUND

Traps for catching fish and crabs are well known as described in U.S. Pat. No. 6,035,575, owned by the present inventor. Such traps commonly include one-way entrance gates that allow marine animals to enter the trap but not to exit. Such entrance gates are called "triggers" in the industry.

U.S. Pat. No. 4,184,283 of Wyman, U.S. Pat. No. 4,843,756 of Wyman et al., U.S. Pat. No. 4,905,405 of Hendricks, U.S. Pat. No. 5,168,653 of Wyman et al., U.S. Pat. No. 5,478,273 of Ives, U.S. Pat. No. 5,771,627 of Mattson et al., and U.S. Pat. No. 6,035,575 of Hilty describe some known triggers for use with fish and crab traps. The trigger described in U.S. Pat. No. 4,184,283 of Wyman includes comb-like structures formed of resilient, plastic tines rigidly mounted at one end to the entrance frame of a trap. U.S. Pat. No. 4,843,756 of Wyman et al. describes a trigger having a rectangular frame supporting resilient plastic tines around the entire frame. The tines extend inwardly from the rectangular frame toward the chamber of the trap so that they converge at their free ends.

The present inventor has realized that many triggers are complex, commonly include multiple moving parts and/or multiple parts that need to be assembled, are expensive to manufacture, and require multiple assembly steps, either during manufacture or during installation into a trap. Fishing regulations in various parts of the world mandate triggers with excluder bars, which are bars that extend across the opening of a trap at specified intervals to prevent larger marine animals from entering the trap. For example, in Alaskan waters, excluder bars on cod traps are required by regulation to prevent halibut from entering the traps. The present inventor has also realized that known triggers commonly require a separate piece, or several separate pieces, to be assembled and used as excluder bars, and that such excluder bars may be left off of triggers or improperly installed.

SUMMARY

The present inventor has recognized the above-described disadvantages associated with known triggers for marine animal traps, and has recognized needs to overcome those disadvantages. Accordingly, embodiments described herein may overcome some or all of the above identified disadvantages, or may address other disadvantages or needs, by providing a trigger for a marine animal trap that is easily manufactured, has few separate components, and requires little assembly. Other embodiments are directed to a method for assembling a marine animal trap trigger from one or two parts.

An exemplary embodiment includes a trigger for a marine animal trap assembled from two identical, substantially flat parts. Using substantially flat parts permits easy, compact stacking of the parts, for example, prior to assembling a trigger and may reduce manufacturing costs such as mould tooling costs as compared to non-substantially flat parts. Each substantially flat part includes multiple fingers extending from a spine, including a first end finger and a second end finger located at opposite ends of the spine. Connector sections with integral connection facilitators for securing the two parts together extend from the first and second end fingers. Living hinges between the connector sections and the first and second end fingers preferably enable the substantially flat parts to be assembled into a trigger that fits a marine animal trap entrance. Triggers assembled from two substantially flat parts may have a shape that permits multiple, assembled triggers to be stacked together in a compact, nesting manner.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
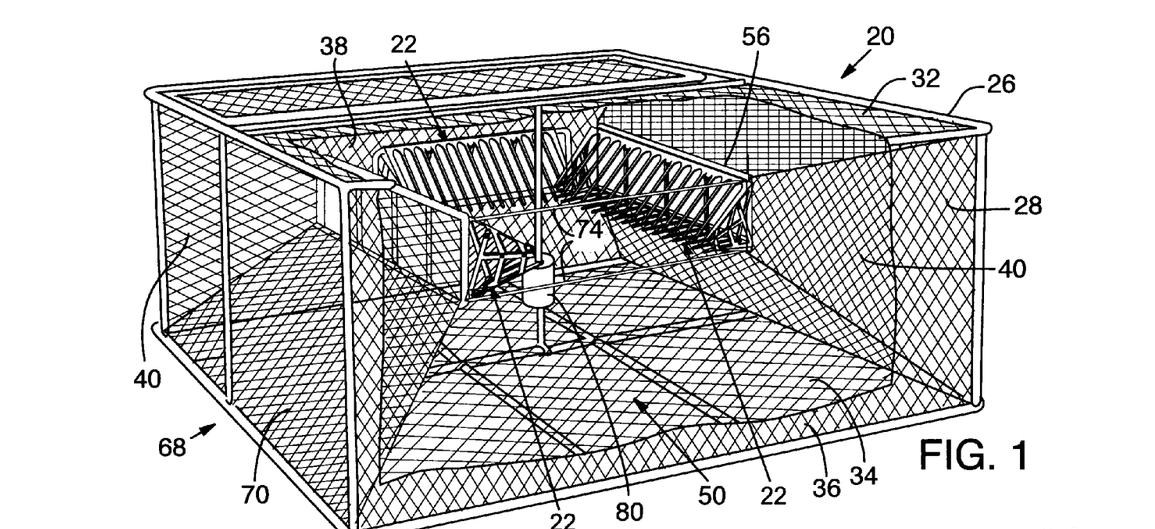
FIG. 1 illustrates an isometric view of a marine animal trap with triggers installed.

FIG. 1 illustrates a marine animal trap 20 fitted with one-way entrance gates 22, or triggers, that represent a first preferred embodiment. Trap 20 is generally box-shaped and includes a structural frame 26 supporting netting 28 that forms top and bottom walls 32 and 34, front and back walls 36 and 38, and a pair of side walls 40 forming a chamber 50 of trap 20. A portion of top wall 32 and front wall 36 are broken away in FIG. 1 to show detail of triggers 22 and chamber 50. Each side wall 40 includes a rectangular entrance frame 56 that defines an entrance opening large enough to allow a marine animal to enter chamber 50. Each entrance frame 56 is formed of a rigid loop of metal rod, preferably rectangular in shape with a short side of approximately 9 inches and a long side of approximately 18, 27, or 36 inches.

A pair of inwardly extending entrance tunnels 68 are formed in side walls 40 so that netting 28 of each side wall 40 converges to terminate at entrance frame 56. Entrance tunnels 68 each include a ramp portion 70 proximal to bottom wall 34. Structural lines 74 join entrance frames 56 and draw them together toward the center of chamber 50 so that entrance tunnels 68 and ramp portions 70 are pulled taut. A piece of bait 80 is suspended within chamber 50 to attract marine animals into trap 20. Entrance frames 56 are shown oriented in generally vertical planes to provide the most direct path to bait 80.

Figure 2:
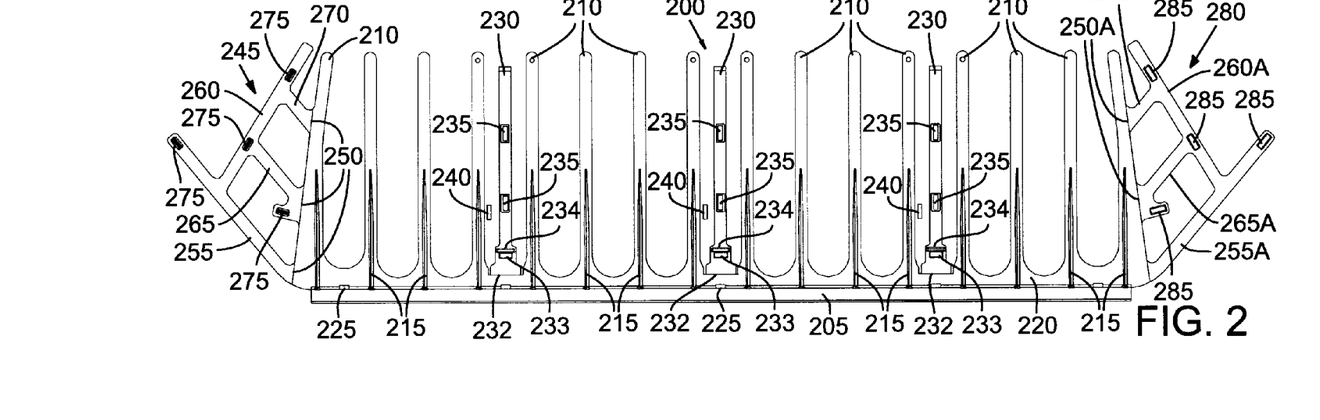
FIG. 2 illustrates a substantially flat gate piece used to form one half of the trigger illustrated in FIG. 1.
Figure 6:
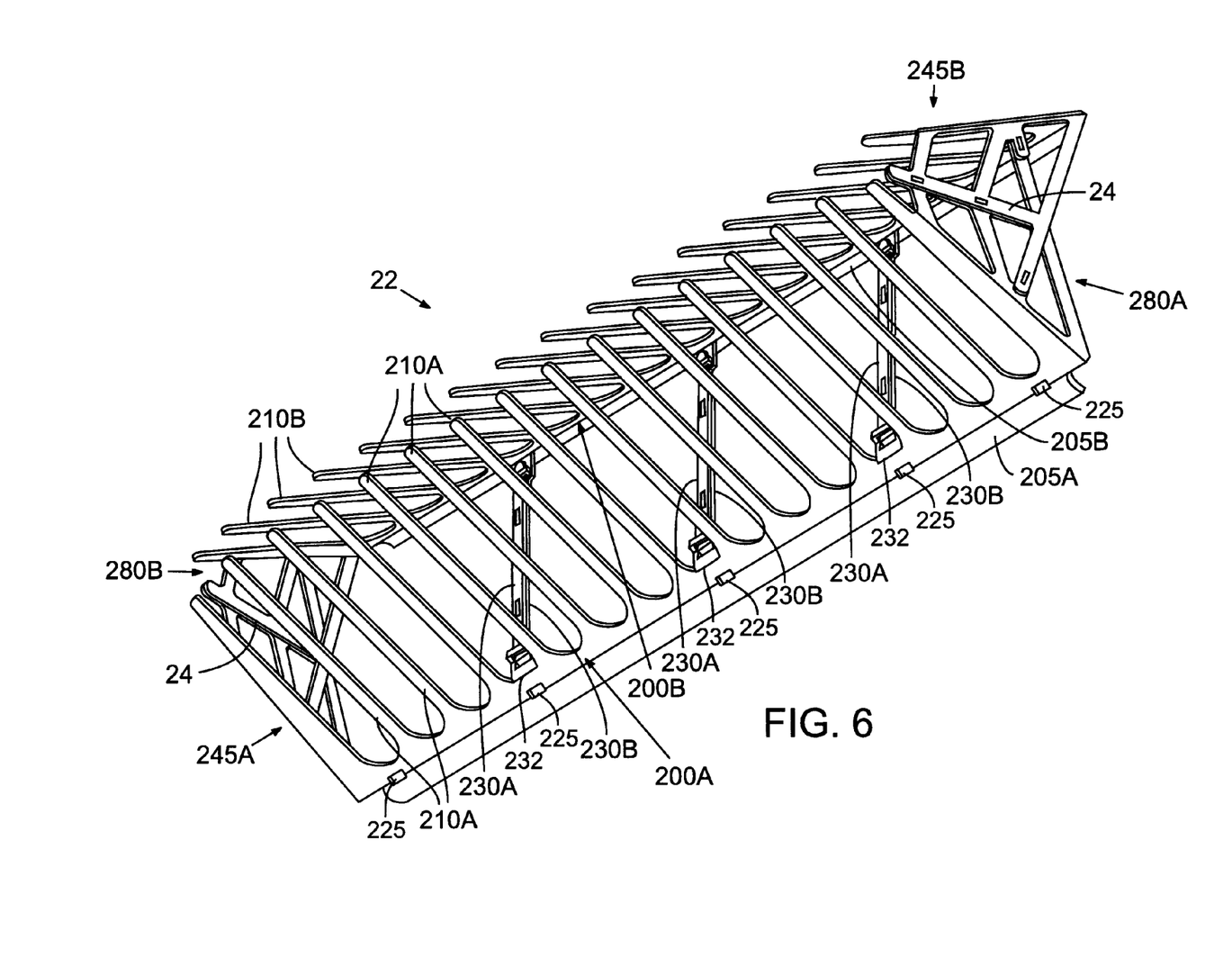
FIG. 6 illustrates a trigger assembled from two of the substantially flat gate pieces illustrated in FIG. 2.

FIG. 2 illustrates a substantially flat gate piece 200 that may be joined with an identical second gate piece 200 to form a trigger 22 (FIG. 6). Substantially flat means that the components that make up gate piece 200 lie between two parallel planes spaced apart from each other, preferably, but not limited to, the range of ¼ inch to 4 inches apart. Gate piece 200 is preferably constructed from one piece of material, for example, by injection or blow molding, machining, casting, or other suitable technique. In a preferred embodiment, flat gate piece 200 is injection molded using polypropylene as the material.

A spine 205 supports a plurality of fingers 210 extending from spine 205 in a first direction. Fingers 210 are preferably flexible and constructed to undergo elastic deformation when flexed beyond the planes containing fingers 210 and spine 205. Fingers 210 are also preferably constructed to inhibit flexing towards one another, which may inhibit gaps from widening between fingers 210 when a trigger 22 (FIG. 6) is used. A support ridge 215 may provide stiffness for fingers 210, and may assist fingers 210 return to a home position, that is, a position close to the originally manufactured position for each finger 210. A web 220 may be formed between fingers 210 and connected to spine 205 between fingers 210. Web 220 may provide additional support to prevent fingers 210 from flexing towards one another. Attachment points 225 may be included to facilitate attaching gate piece 200, singularly or in an assembled trigger 22 (FIG. 6), to a marine animal trap. Attachment points 225 may be apertures that permit straps, such as nylon wire ties or other suitable strap, to pass through the attachment points 225 and over spine 205, but under web 220, to secure a flat gate piece 200 to a marine animal trap, for example, to rectangular entrance frame 56.

One or more optional excluder bars 230 may be included interspersed among fingers 210. Excluder bars 230 may be spaced apart to be used to provide a maximum opening in a completed trigger 22 (FIG. 6). For example, excluder bars 230 may be spaced approximately 9 inches apart. Excluder bars 230 preferably include an integrally formed connection facilitator, which is constructed to interface, or to facilitate interfacing, with a suitable integral connection facilitator on an excluder bar on a second flat gate piece 200. Two, or more, connection facilitators may interface, or facilitate interfacing, by being proximate each other and having an independent component secure them together, or by having elements of one connection facilitator engage elements of the other connection facilitator. The integrally formed connection facilitator on an excluder bar 230 may include one or more female sockets 235. Female sockets 235 may connect or interface by being tied together, by having a male plug 240 engage two overlying female sockets 235, or by other suitable manner. A male plug 240 may be releasably attached to flat gate piece 200, for example by being molded with a relatively weak, or break-off, tab 241 attaching the male plug 240 to a finger 210 or an excluder bar 230. In one embodiment, each excluder bar 230 includes two female sockets 235 and one male plug 240. When two substantially flat gate pieces 200 are connected to form a trigger 22, described below, one male plug 240 may be removed from each flat gate piece 200 and used to engage, or secure, one set of overlapping female sockets 235 together.

In an alternate embodiment, each excluder bar 230 includes an excluder aperture 233 and a loop 234 proximate or overlying the excluder aperture 233. Preferably, two loops 234 are included, one on each opposing side of an excluder bar 230. Excluder loops 234 on a first excluder bar 230 are preferably sized to permit a free end of a second excluder bar 230 to pass through the loops 234. Alternately, the excluder bar 230 may also pass through the excluder aperture 233.

Figure 7:
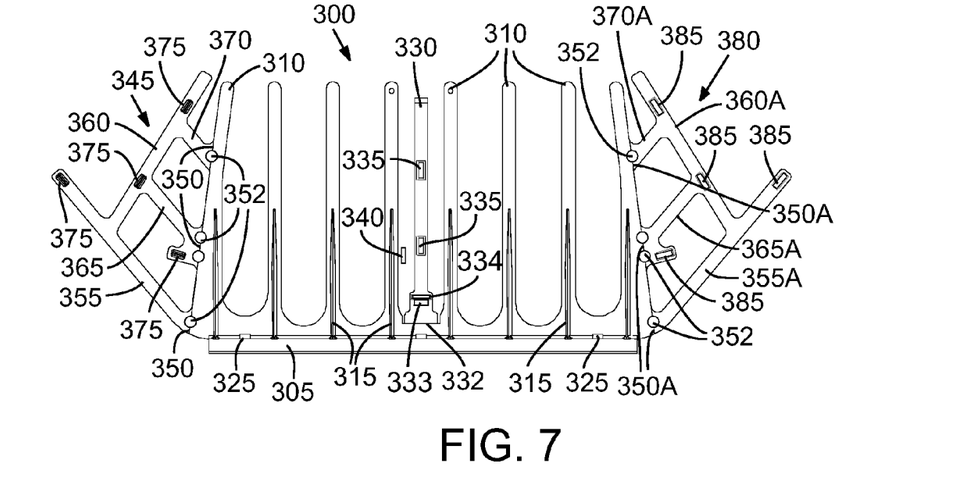
FIG. 7 illustrates another embodiment of a substantially flat gate piece.

Spine 205 preferably has a first connector section 245 and a second connector section 280 integrally attached, or formed, at opposite ends of spine 205. Both connector sections 245 and 280 are preferably constructed to bend along a fold line, a hinge, or other suitable structure, beyond the planes containing the substantially flat gate piece 200. For example, an integrally molded hinge, such as a living hinge, may be included along lines 250 and 250A on the first and second end fingers 210 located at opposite ends of the spine 205. A living hinge may include a channel of material that is approximately ⅓ to ½ the thickness of other components, such as fingers 210, for example. As illustrated in FIG. 7, discussed below, a series of holes (352 in FIG. 7) or other suitable structure may be included to assist connector sections 245 and 280 to bendably attach, that is, to be bent without breaking off from the substantially flat gate piece 200.

Figure 3:
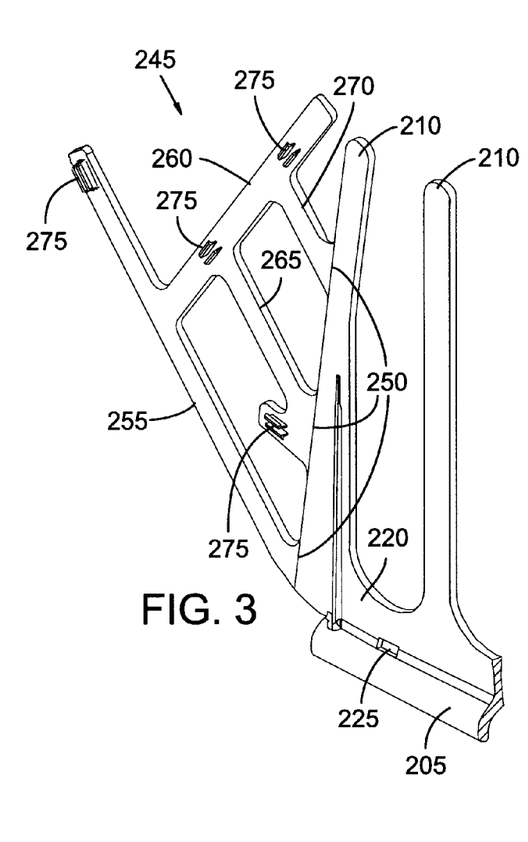
FIG. 3 illustrates an exploded view of a first connector section on the substantially flat gate piece of FIG. 2.

FIG. 3 illustrates an enlarged view of first connector section 245. In the illustrated embodiment, first connector section 245 includes a plurality of connector arms 255, 260, 265, and 270. Connector arms 255, 260, 265, and 270 preferably serve two functions. The first is to support integrally formed connection facilitators, which are illustrated as male plugs 275. Other suitable connection facilitators such as, but not limited to; a combination of apertures for receiving ties, such as zip ties, wire, twine, or other suitable tie; indentations, hooks, or other suitable structure to assist holding ties, tape, or adhesives, in place; or hook and loop fasteners may be used in alternate embodiments. The second function is to cooperate with a second connector section 280 (located on a second gate piece 200) to form a sidewall 24 (FIG. 6) when two gate pieces 200 are assembled to form a trigger 22, described below. The arrangement of connector arms 255, 260, 265, and 270 may thus vary depending on the desired structure for sidewalls 24, the location of integral connection facilitators, or both.

Figures 4, 4A:
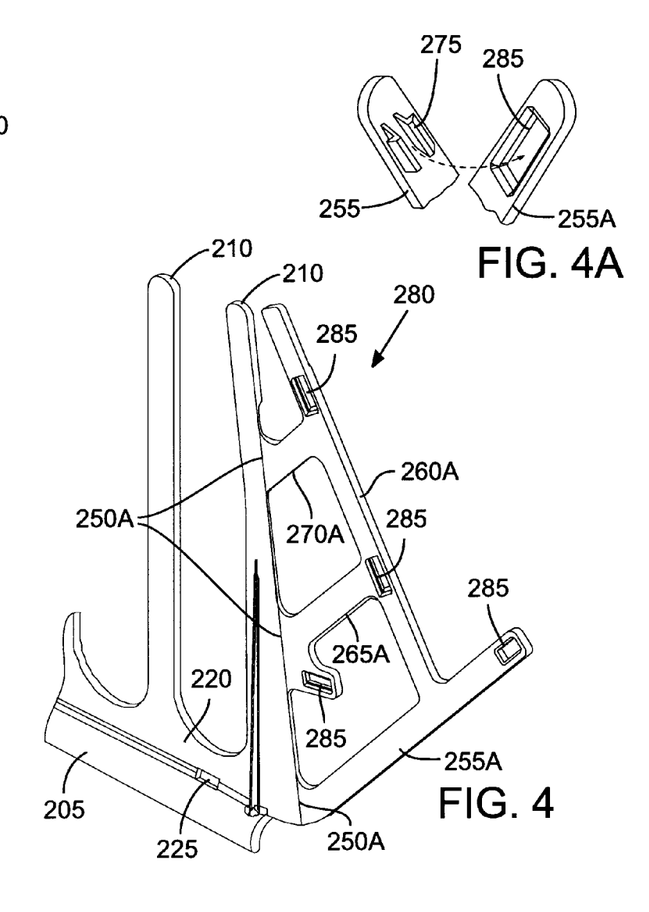
FIG. 4 illustrates an exploded view of a second connector section on the substantially flat gate piece of FIG. 2.
FIG. 4A illustrates an exemplary engagement for connection facilitators.

FIG. 4 illustrates an enlarged view of second connector section 280. Second connector section 280 is preferably a substantial mirror image of first connector section 245 and includes connector arms 255A, 260A, 265A, and 270A. Integral connection facilitators on the second connector section 280 are preferably located at mirror image positions compared to connection facilitators located on the connector section 245. Connection facilitators, illustrated as female sockets 285, are preferably configured to engage the connection facilitators located on the connector section 245, and therefore may differ from the construction of the connection facilitators located on the connector section 245. FIG. 4A illustrates one example of how male plugs 275 may lock into female sockets 285. Locking includes inserting male plugs 275 into female sockets 285 so the male plugs 275 and female sockets 285 do not release from each other as well as engaging male plugs 275 with female sockets 285 so the male plugs 275 and female sockets 285 may release from each other, for example, by squeezing the two portions of male plug 275 together.

One advantage of having two connector sections 245 and two connector sections 280 in conjunction with one or more excluder bars 230 may be that an assembled trigger 22 (FIG. 6) may have multiple connection or support points, or both, that may assist trigger 22 to hold its assembled shape, may provide rigidity for trigger 22, or may prevent the fingers 210 from becoming substantially separated during use, singularly or in any combination. For example, multiple connection or support points, or both, may retain the fingers 210 extending towards one another to retain the one-way gate function of trigger 22.

Additional support for trigger 22 may be provided by securing trigger 22 to entrance frame 56. For example, trigger 22 may be positioned in place over entrance frame 56 and ties, such as zip ties, may be used to secure trigger 22 to entrance frame 56 by running through attachment points 225 and around entrance frame 56. When pressure is applied to grip enhancing structure 307 (FIG. 8), grip enhancing structure 307 may embed in twine, rubber, or other material that is holding netting 28 onto entrance frame 56, thereby inhibiting trigger 22 from rotating, twisting, or otherwise moving out of position.

Figure 5:
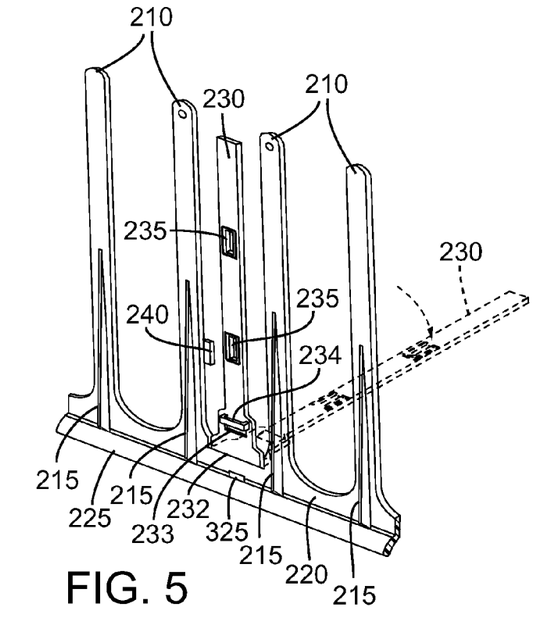
FIG. 5 illustrates an excluder bar and how it may bend without detaching from the substantially flat gate piece of FIG. 2.

FIG. 5 illustrates an enlarged view of how an excluder bar 230 may be formed as part of spine 205, either directly (not illustrated), or indirectly via web 220 as illustrated. Preferably, excluder bar 230 is bendably attached to the spine 205, for example, excluder bar 230 can bend beyond the planes containing the gate piece 200 without breaking away from spine 205. For example, an integrally molded hinge 232, such as a living hinge, may be included at the base of excluder bar 230.

FIG. 6 illustrates a trigger 22 assembled from a first gate piece 200A and a second gate piece 200B. Trigger 22 may be assembled in the following manner. First bending, or folding, the first connector section 245A on the first gate piece 200A in a second direction that is substantially orthogonal to the first direction the fingers 210A extend from spine 205A. Then bending, or folding, the second connector section 280A on the first gate piece 200A in the second direction. Next bending, or folding, the first connector section 245B on the second gate piece 200B in a third direction that is substantially orthogonal to the first direction the fingers 210B extend from spine 205B. Then bending, or folding, the second connector section 280B on the second gate piece 200B in the third direction.

The first connector section 245A of the first gate piece 200A may then be overlapped with the second connector section 280B of the second gate piece 200B so the fingers of the first gate piece 200A extend towards the fingers of the second gate piece 200B. The first connector section 245A is secured to the second connector section 280B, preferably by interfacing the connection facilitators on connector section 245A with the connection facilitators on connector section 280B, for example, by engaging male plugs 275 (FIG. 3) with female sockets 285 (FIG. 4). Likewise, the second connector section 280A of the first gate piece 200A may be overlapped with the first connector section 245B of the second gate piece 200B. The second connector section 280A is preferably secured to the first connector section 245B in a similar manner.

The excluder bars 230A and excluder bars 230B may be bent, or folded, towards one another and secured to one another. For example, the excluder bars 230B may be bent, or folded, towards the first gate piece 200A. Then the excluder bars 230A may be bent, or folded, towards the second gate piece 200B and overlaid on excluder bars 230B. The excluder bars 230A and 230B are then secured to one another, for example, by removing male plugs 240 from both pieces 200A and 200B and using the six male plugs 240 to engage, or connect, each of the six sets of overlapping female sockets 235. In FIG. 6, the excluder bars 230A and 230B are illustrated without the male plugs 240 in place to show how the female sockets 235 overlap. The free end of each excluder bar 230A and 230B is preferably held in place by a loop 234 located at the base of an opposing excluder bar 230B or 230A, respectively.

FIG. 7 provides a front view of another embodiment of a substantially flat gate piece 300. As illustrated in FIG. 7, a substantially flat gate piece 300 may be constructed with varying lengths of the spine 305 and with any number of fingers 310, and excluder bars 330. The number of, and spacing between, fingers 310, excluder bars 330, or both, may depend on the size of a trap entrance, the desired specie to trap, or other suitable factor. Thus, triggers may be assembled to fit within entrance frames 56 having various lengths and widths. A series of holes 352 are included along each of lines 350 and 350A to assist connector sections 345 and 380 to bendably attach, that is, to be bent without breaking off from the substantially flat gate piece 300.

Figure 8:
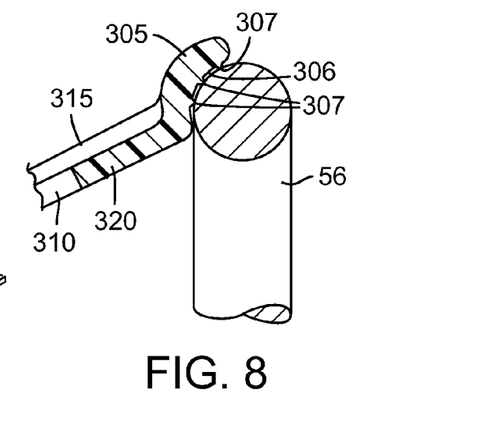
FIG. 8 illustrates a cross sectional view of a spine portion of the substantially flat gate piece of FIG. 7 interfacing with an entrance to a marine animal trap.

As seen in FIG. 7, and better illustrated in FIG. 8, spine 305 may be contoured to fit or rest against frame 56. For example, a curved gate surface 306 may be included on spine 305 to substantially match round tubes forming frame 56. Alternately, gate surface 306 may be curved to have a shape that matches, or substantially matches, rectangular, square, triangular or other shaped bars used to form frame 56. Grip enhancing structures 307 may be included on gate surface 306, and may prevent or inhibit surface 306 from slipping with respect to frame 56 when a trigger is secured to frame 56. Grip enhancing structures 307 may include ridges running the length of surface 306, intermittent ridges over all, or parts of surface 306, dots, teeth, or other suitable structures. Grip enhancing structures 307 may embed into materials covering or on frame 56, may embed into frame 56, or both, when a gate 300 is secured to frame 56.

Figure 9:
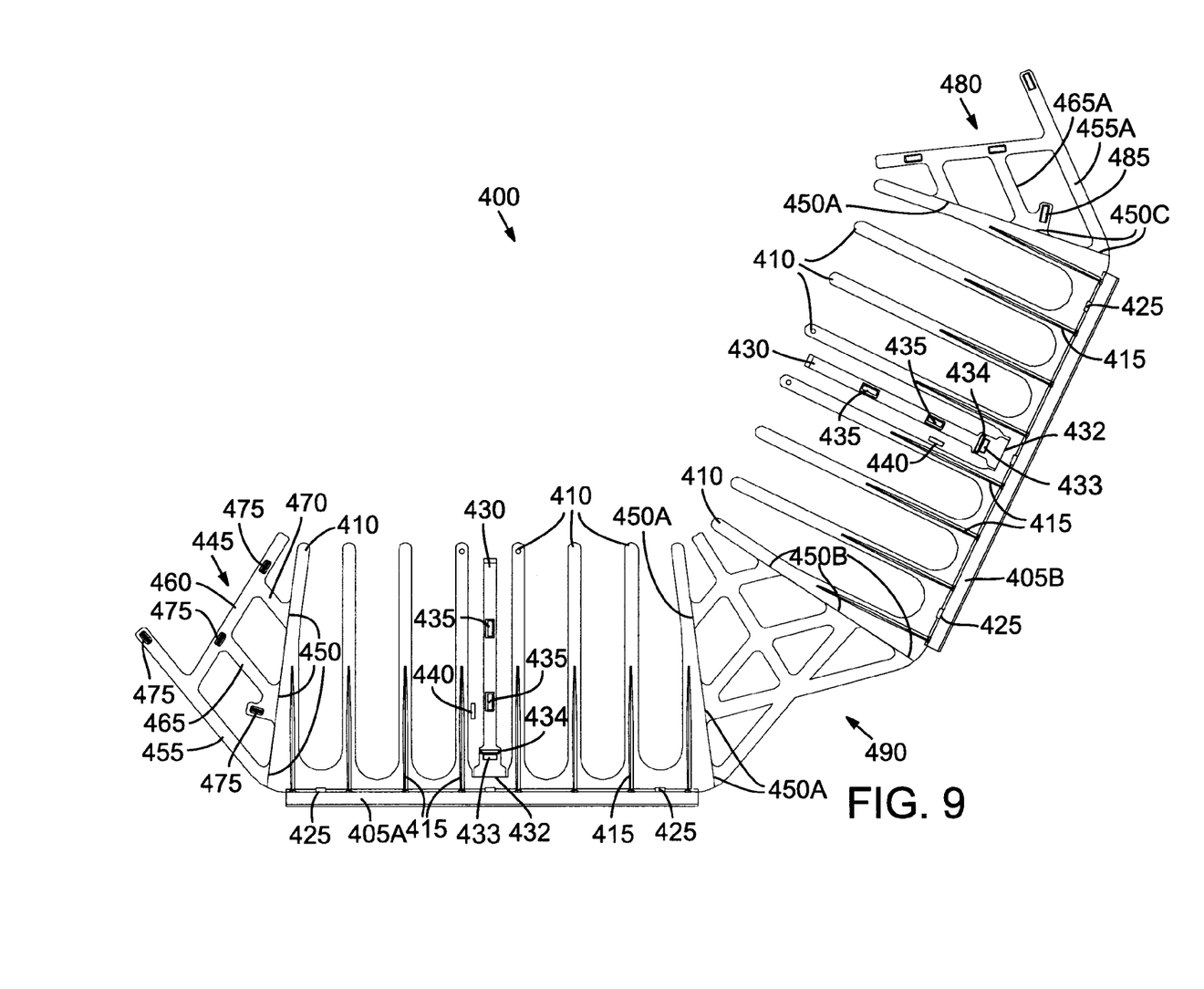
FIG. 9 illustrates another substantially flat gate piece used to form a trigger.
Figure 10:
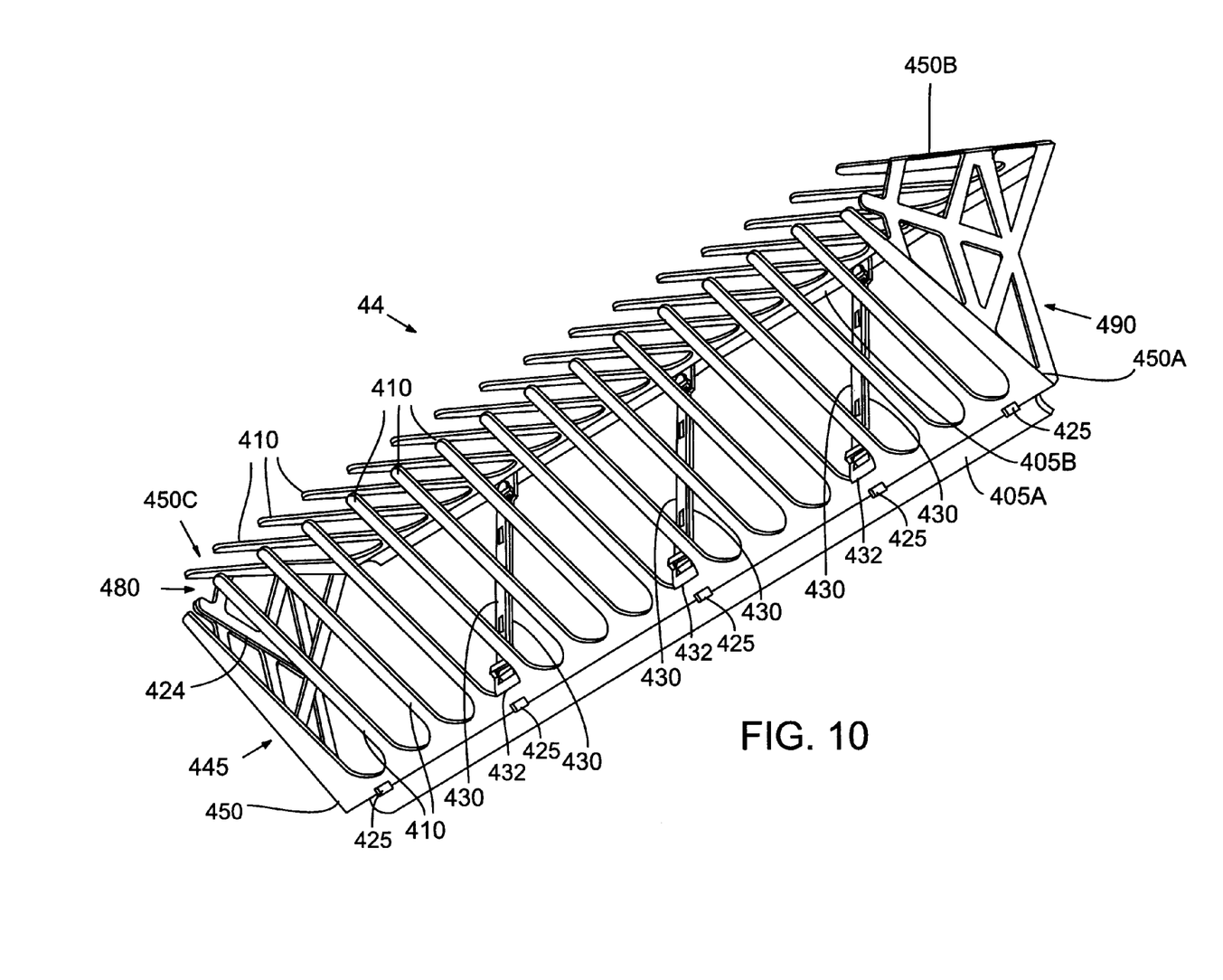
FIG. 10 illustrates a trigger formed from the substantially flat gate piece illustrated in FIG. 9.

FIG. 9 illustrates a single gate piece 400 that may be folded to form a trigger 44 (FIG. 10). Gate piece 400 is similar to two gate pieces 300 that are attached together by engaging the first connector section 345 of the first gate piece 300 with the second connector section 380 of the second gate piece 300, while both the first and second gate pieces 300 remain substantially flat.

Instead of using two separate, but substantially identical gate pieces 300 to form a trigger, the embodiment illustrated in FIG. 9 uses one gate piece 400 to form a trigger 44. Gate piece 400 includes a first connector section 445 bendably connected to a first spine 405A and a second connector section 480 bendably connected to a second spine 405B. The connector sections 445 and 480 are preferably similar to the first connector section 245 and the second connector section 280 described above. Likewise, other components such as fingers 410, excluder bars 430, fold lines, or hinges, 450-450C are similar to like components described above. A difference between gate piece 400 and gate piece 300 is inclusion of end wall 490 bendably connected to spine 405A and bendably connected to spine 405B. End wall 490 includes fold lines, or hinges 450A and 450B, but preferably does not include connection facilitators, such as female sockets 285 and male plugs 275.

FIG. 10 illustrates a trigger 44 assembled from the gate piece illustrated in FIG. 9. A trigger 44 is assembled from gate piece 400 by folding the first connector section 445 about hinge, or fold line, 450, then folding end wall 490 about hinge, or fold line, 450A. The second spine 405B is folded about hinge, or fold line, 450B. Connector section 480 is then folded about fold line, or hinge, 450C. Side wall 424 is made by securing connector section 480 to connector section 445, preferably with connection facilitators similar to female sockets 285 and male plugs 275 described above. If excluder bars 430 are included, the excluder bars 430 are folded so opposing excluder bars 430 overlie each other and are secured together, preferably using integrally formed connection facilitators.

It will be obvious to those having skill in the art that many changes may be made to the details of the above-described embodiments without departing from the underlying principles of the invention. The scope of the present invention should, therefore, be determined only by the following claims.

The invention claimed is:

1. A substantially flat gate piece for use in a marine animal trap comprising:
   an elongate spine having a first end and a second end;
   a plurality of fingers integrally formed with the spine and spaced apart along the spine, the fingers extending from the spine in a first direction and including a first end finger proximate the first end of the spine and a second end finger proximate the second end of the spine;
   a first connector section integrally formed with and bendably attached directly to the first end finger via a folding structure selected from the group consisting of a fold line, a living hinge and a series of holes, the first connector section substantially extending in the first direction, and the first connector section including integral connection facilitators; and
   a second connector section integrally formed with and bendably attached directly to the second end finger via a folding structure selected from the group consisting of a fold line, a living hinge and a series of holes, the second connector section substantially extending in the first direction, and the second connector section including integral connection facilitators; wherein
   the spine, the plurality of fingers, the first connector assembly, and the second connector assembly are substantially flat with respect to one another to form the substantially flat gate piece.

2. A substantially flat gate piece for use in a marine animal trap according to claim 1, wherein the integral connection facilitators of the first connector section are constructed to interface with integral connection facilitators identical to the integral connection facilitators of the second connector section, but located on a second substantially flat gate piece; and the integral connection facilitators of the second connector section are constructed to interface with integral connection facilitators identical to the integral connection facilitators of the first connector section, but located on the second substantially flat gate piece.

3. A substantially flat gate piece for use in a marine animal trap according to claim 2, wherein the integral connection facilitators on the first connector section include male plugs and the integral connection facilitators on the second connector section include female sockets sized to receive the male plugs.

4. A substantially flat gate piece for use in a marine animal trap according to claim 3, wherein the male plugs include a structure to lock the plugs in the sockets.

5. A substantially flat gate piece for use in a marine animal trap according to claim 1, further including an excluder bar integrally formed with the spine, the excluder bar bendably attached to the spine via a folding structure selected from the group consisting of a fold line, a living hinge and a series of holes, and the excluder bar extending from the spine in the first direction.

6. A substantially flat gate piece for use in a marine animal trap according to claim 5, further comprising an integrally formed connection facilitator on the excluder bar shaped and sized to directly connect to another excluder bar on a separate, substantially flat gate piece.

7. A substantially flat gate piece for use in a marine animal trap according to claim 6, wherein the integrally formed connection facilitator on the excluder bar includes a female socket; and further comprising
a male plug detachably connected to the substantially flat gate piece, the detachable male plug sized to engage the female socket on the excluder bar.

8. A substantially flat gate piece for use in a marine animal trap according to claim 1, wherein the spine includes a longitudinal length and a curved portion running substantially the longitudinal length of the spine, the curved portion including a gate surface configured to interface with an entrance to a marine animal trap.

9. A substantially flat gate piece for use in a marine animal trap according to claim 8, wherein the gate surface of the spine includes a grip enhancing structure selected from the group consisting of ridges running the length of the gate surface, intermittent ridges on the gate surface, dots on the gate surface and teeth on the gate surface.

10. A gate for a marine animal trap formed from a first substantially flat gate piece connected to a second substantially flat gate piece, the first and second gate pieces each comprising:
   an elongate spine having a first end and a second end;
   a plurality of fingers integrally formed with the spine and spaced apart along the spine, the fingers extending from the spine in a first direction with respect to the spine and including a first end finger proximate the first end of the spine and a second end finger proximate the second end of the spine;
   a first connector section integrally formed and bendably attached to the first end finger, the first connector section substantially extending in the first direction, and the first connector section including integral connection facilitators; and
   a second connector section integrally formed and bendably attached to the second end finger, the second connector section substantially extending in the first direction, and the second connector section including integral connection facilitators; wherein
   the fingers from the first substantially flat gate piece converge towards the fingers from the second substantially flat gate piece;
   the connection facilitators on the first connector section of the first substantially flat gate piece engage the connection facilitators on the second connector section of the second substantially flat gate piece; and
   the connection facilitators on the second connector section of the first substantially flat gate piece engage the connection facilitators on the first connector section of the second substantially flat gate piece.

11. The gate according to claim 10, wherein:
   the first substantially flat gate piece further includes an excluder bar integrally formed with the spine, the excluder bar bendably attached to the spine, and the excluder bar extending from the spine in the first direction;
   the second substantially flat gate piece further includes an excluder bar integrally formed with the spine, the excluder bar bendably attached to the spine, and the excluder bar extending from the spine in the first direction; and
   the excluder bar of the first substantially flat gate piece is bent towards the second substantially flat gate piece, the excluder bar on the second substantially flat gate piece is bent towards the first substantially flat gate piece, and the excluder bar of the first substantially flat gate piece is connected to the excluder bar of the second substantially flat gate piece.

12. A substantially flat gate piece for use in a marine animal trap comprising:

a first elongate spine having a first end and a second end;
a plurality of fingers integrally formed with the first spine and spaced apart along the first spine, the fingers extending from the first spine in a first direction and including a first end finger proximate the first end of the first spine and a second end finger proximate the second end of the first spine;
a first connector section integrally formed and bendably attached to the first end finger of the first spine, the first connector section substantially extending in the first direction, and the first connector section including integral connection facilitators;
a second elongate spine having a first end and a second end;
a plurality of fingers integrally formed with the second spine and spaced apart along the second spine, the fingers extending from the second spine in a second direction and including a first end finger proximate the first end of the second spine and a second end finger proximate the second end of the second spine;
a second connector section integrally formed and bendably attached to the second end finger of the second spine, the second connector section substantially extending in the second direction, and the second connector section including integral connection facilitators; and
an end wall integrally formed with and bendably attached to the second end finger of the first spine, the end wall integrally formed with and bendably attached to the first end finger of the second spine, thereby bendably connecting the first spine and the second spine; wherein
the first spine, the second spine, the plurality of fingers of the first spine, the plurality of fingers of the second spine, the end wall, the first connector assembly, and the second connector assembly are substantially flat with respect to one another to form the substantially flat gate piece.

13. A substantially flat gate piece for use in a marine animal trap according to claim 12, further including an excluder bar integrally formed with and bendably attached to the first spine, and an excluder bar integrally formed with and bendably attached to the second spine, the excluder bar attached to the first spine extending from the first spine in the first direction, and the excluder bar attached to the second spine extending from the second spine in the second direction.

14. A substantially flat gate piece for use in a marine animal trap according to claim 13, further comprising:
an integrally formed connection facilitator on the excluder bar attached to the first spine; and
an integrally formed connection facilitator on the excluder bar attached to the second spine.

15. A substantially flat gate piece for use in a marine animal trap according to claim 12, wherein the first spine includes a longitudinal length and a curved portion running substantially the longitudinal length of the first spine, the second spine includes a longitudinal length and a curved portion running substantially the longitudinal length of the second spine, and both curved portions include a gate surface for interfacing with an entrance to a marine animal trap.

16. A substantially flat gate piece for use in a marine animal trap according to claim 15, wherein the gate surfaces of the first and second spines each include a grip enhancing structure.

17. A method for assembling a marine animal trap gate with a substantially flat gate piece, the substantially flat gate piece including a first spine having a first end and a second end and integrally formed fingers extending from the first spine, a second spine having a first end and a second end and integrally formed fingers extending from the second spine, and an end wall attached to the second end of the first spine and to the first end of the second spine, comprising:
folding a first connector section attached to the first end of the first spine in a first direction;
folding the end wall attached to the second end of the first spine in the first direction;
folding the second spine attached to the end wall in a second direction;
folding a second connector section attached to the second end of the second spine in a third direction;
overlapping the first connector section of the first spine with the second connector section of the second spine so the fingers of the first spine converge towards the fingers of the second spine; and
engaging integral connection facilitators on the first connector section of the first spine with integral connection facilitators on the second connector section of the second spine.

18. A method for assembling a marine animal trap gate with a substantially flat gate piece according to claim 17, wherein:
the first spine further includes an integrally formed excluder bar, the excluder bar bendably attached to the first spine;
the second spine further includes an integrally formed excluder bar, the excluder bar bendably attached to the second spine; and the method further comprising:
folding the excluder bar of the first spine towards the second spine;
folding the excluder bar of the second spine towards the first spine; and
connecting the excluder bar of the first spine to the excluder bar of the second spine.

19. A method for assembling a marine animal trap gate with a first substantially flat gate piece and a second substantially flat gate piece, the first and second substantially flat gate pieces each including a spine with integrally formed fingers extending from the spine, comprising:
folding a first connector section of the first substantially flat gate piece in a first direction;
folding a second connector section of the first substantially flat gate piece in the first direction;
folding a first connector section of the second substantially flat gate piece in a second direction;
folding a second connector section of the second substantially flat gate piece in the second direction;
locating the first substantially flat gate piece and the second substantially flat gate piece so the fingers of the first substantially flat gate piece converge towards the fingers of the second substantially flat gate piece;
overlapping the first connector section of the first substantially flat gate piece with the second connector section of the second substantially flat gate piece;
engaging integral connection facilitators on the first connector section of the first substantially flat gate piece with integral connection facilitators on the second connector section of the second substantially flat gate piece;
overlapping the second connector section of the first substantially flat gate piece with the first connector section of the second substantially flat gate piece; and
engaging integral connection facilitators on the second connector section of the first substantially flat gate piece with integral connection facilitators on the first connector section of the second substantially flat gate piece.

20. A method for assembling a marine animal trap gate with a first substantially flat gate piece and a second substantially flat gate piece according to claim 19, wherein:

the first substantially flat gate piece further includes an excluder bar integrally formed with the spine, the excluder bar bendably attached to the spine;

the second substantially flat gate piece further includes an excluder bar integrally formed with the spine, the excluder bar bendably attached to the spine; and the method further comprising:

folding the excluder bar of the first substantially flat gate piece towards the second substantially flat gate piece;

folding the excluder bar of the second substantially flat gate piece towards the first substantially flat gate piece; and connecting the excluder bar of the first substantially flat gate piece to the excluder bar of the second substantially flat gate piece.

\* \* \* \* \*